(12) United States Patent
Biswas et al.

(10) Patent No.: US 7,443,849 B2
(45) Date of Patent: Oct. 28, 2008

(54) MECHANISMS FOR DETECTION OF NON-SUPPORTING NAT TRAVERSAL BOXES IN THE PATH

(75) Inventors: Kaushik P. Biswas, San Jose, CA (US); Senthil M. Sivakumar, Cupertino, CA (US); Melinda L. Shore, Ithaca, CA (US)

(73) Assignee: Cisco Technology, Inc., San Jose, CA (US)

( * ) Notice: Subject to any disclaimer, the term of this patent is extended or adjusted under 35 U.S.C. 154(b) by 643 days.

(21) Appl. No.: 11/026,891

(22) Filed: Dec. 30, 2004

(65) Prior Publication Data

US 2006/0146813 A1 Jul. 6, 2006

(51) Int. Cl.
*H04L 12/28* (2006.01)
*H04L 12/56* (2006.01)
*H04J 3/16* (2006.01)
*H04J 3/22* (2006.01)

(52) U.S. Cl. .................. 370/389; 370/392; 370/466; 370/467

(58) Field of Classification Search ............... 370/389, 370/392, 401, 466, 467
See application file for complete search history.

(56) References Cited

U.S. PATENT DOCUMENTS

| 7,272,148 | B2 * | 9/2007 | Zhang et al. | 370/401 |
| 2005/0259637 | A1 * | 11/2005 | Chu et al. | 370/352 |
| 2006/0078096 | A1 * | 4/2006 | Poyhonen et al. | 379/88.12 |
| 2006/0120293 | A1 * | 6/2006 | Wing | 370/241 |
| 2007/0053328 | A1 * | 3/2007 | Riittinen et al. | 370/338 |

OTHER PUBLICATIONS

J. Rosenberg, et al. "STUN-Simple Traversal of User Datagram Protocol (UDP) Through Network Address Translators (NATs)," Copyright The Internet Society (2003). RFC 3489. pp. 1-37.

S. Srisuresh, et al. "IP Network Address Translator (NAT) Terminology and Considerations," Copyright The Internet Society (1999). RFC 2663. pp. 1-24.

(Continued)

*Primary Examiner*—Firmin Backer
*Assistant Examiner*—Farah Faroul
(74) *Attorney, Agent, or Firm*—Weaver Austin Villeneuve & Sampson LLP

(57) ABSTRACT

Disclosed are methods and apparatus for facilitating translation of packet addresses (or ports) by one or more translation devices (e.g., Network Address Translation or NAT devices) using a specialized protocol to handle an address (or port) that is used to form part of a payload. In one implementation, this specialized protocol is referred to as Network Layer Signaling (NLS). As a packet traverses along a path containing one or more translation devices, each translation device is configured to translate an address (or port) of such packet's IP header if the packet is traversing between different domains (e.g., traversing between a private and public domain or between two different private domains). One or more of these translation devices may also be configured to implement the specialized protocol which includes translation device traversal mechanisms for detecting whether the traversal path contains a translation device that fails to implement such specialized protocol. When such a failure is detected, recovery mechanisms are also triggered.

31 Claims, 7 Drawing Sheets

OTHER PUBLICATIONS

R.P. Swale, et al. "Middlebox Communications (midcom) Protocol Requirements," Copyright The Internet Society (2002). RFC 3304.

P. Srisuresh, et al., "Middlebox Communication Architecture and Framework," Copyright The Internet Society (2002). RFC 3303. pp. 1-27.

A. Simu, et al., "Method and Apparatus for Indicating Network Address Translation (NAT) Topology Information to a NAT Device that is Physically Separate From an Application Layer Gateway (ALG) Device." U.S. Appl. No. 10/125,300, filed Apr. 17, 2002.

M. Somasundaram, et al., "Method and Apparatus for Handling Embedded Addresses in Data Sent Through Multiple Network Address Translation (NAT) Devices." U.S. Appl. No. 10/202,973, filed Jul. 24, 2002.

K. Biswas, et al., "Method and Apparatus for Making End-Host Network Address Translation (NAT) Global Address and Port Ranges Aware", U.S. Appl. No. 10/160,321, filed May 31, 2002.

M. Shore, "Address Tagging for Network Address Translation (NAT) Traversal," U.S. Appl. No. 10/985,563, filed Nov. 9, 2004.

* cited by examiner

US 7,443,849 B2

MECHANISMS FOR DETECTION OF NON-SUPPORTING NAT TRAVERSAL BOXES IN THE PATH

BACKGROUND OF THE INVENTION

The present invention relates to methods and apparatus for processing data within a computer network. More specifically, it relates to mechanisms for handling data generated by applications that use embedded addresses while such data is traversing a Network Address Translation (NAT) device or a like device.

For a particular computer to communicate with other computers or web servers within a network (e.g., the Internet), the particular computer must have a unique IP (Internet Protocol) address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP addresses is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may duplicate IP address that are used outside of the local network. When a local computer attempts to communicate with a computer outside the local network, the intermediary device matches the local computer's local IP address (and port) to one of the intermediary device's assigned IP addresses (and ports). The intermediary device then replaces the local computer's local address (and port) with the matched assigned IP address (and port). This matched assigned IP address (and port) is then used to communicate between the local computer and the outside computer. Thus, NAT techniques allow IP address to be duplicated across local networks.

Another solution to the lack of available IP addresses is to redesign the address format to allow for more possible IP addresses. The recent introduction of IPv6 provides 128 bits for the IP address, as compared with IPv4 which provides 32 bits for the IP address. However, until all network devices and computers are converted to IPv6, it is still necessary to allow an existing IPv4 device to communicate with an IPv6 device. One popular method that allows IPv4 to IPv6 communication is referred to as protocol translation (NAT-PT). The IP addresses are converted by NAT-PT from one protocol to another protocol (e.g., IPv4 to IPv6 or vice versa) or, more generally, from an external protocol to an internal protocol. In addition to the IP addresses, the NAT-PT also converts any relevant IPv4 or IPv6 information during a protocol translation.

In addition to IP addresses, a packet may also contain address(es), as well as other protocol specific fields, embedded in the payload that require translation. Particular applications may embed address(es) in the payload for various application specific purposes. A current approach for supporting applications which embed IP addresses in the payload in a NAT environment is to add application-specific knowledge (referred to as an application level gateway or ALG) within the NAT device itself. This approach is described in detail in the Internet Engineering Task Force's Request for Comments document, having RFC 2663, entitled "IP Network Address Translator (NAT) Terminology and Considerations" by P. Srisuresh and M. Holdrege of Lucent Technologies (August 1999), which document is incorporated herein by reference in its entirety.

A NAT device may be configured with various ALG's which correspond to different applications which embed addresses using different formats in the payload. That is, an ALG must be designed for each specific format of the payload so as to be able to locate one or more addresses embedded in the payload by a specific type of application, such as a DNS (domain name server) application.

Other approaches include NAT traversal mechanisms to avoid the problem by allowing a NATted endpoint to "discover" its external address as described in Internet Engineering Task Force's Request for Comments document, having RFC 3489, entitled "Simple Traversal of User Datagram Protocol (UDP) Through Network Address Translators (NATs)" by J. Rosenberg et al. of Cisco Systems, Inc. (March 2003), which document is incorporated herein by reference in its entirety. Another approach allows the endpoint to request an external address or to request it in advance, which is described in (1) the Internet Engineering Task Force's Request for Comments document, having RFC 3304, entitled "Middlebox Communications (midcom) Protocol Requirements" by R. P. Swale et al. of Cisco Systems, Inc. (August 2002) and (2) the Internet Engineering Task Force's Request for Comments document, having RFC 3303, entitled "Middlebox Communications Architecture and Framework" by P. Srisuresh et al. (August 2002), which documents are incorporated herein by reference in their entirety.

Although conventional approaches for NAT ALG with packets utilizing addresses as part of the payload work adequately under some circumstances, under other situations these approaches have significant disadvantages. Aside from the complexity and expense of these approaches (e.g., supporting stateful inspection for a diversity of protocols and protocol versions in the ALG configured NAT devices), the embedded addresses cannot be handled at all when they are encrypted. Additionally, an endpoint may be configured to perform an integrity check on the data and this check may fail if the data has changed (e.g., an embedded address has been replaced with a different translated address by an ALG-NAT device.

Conventional NAT traversal mechanisms assume that the network includes NAT devices that are all supporting such. However, one or more NAT devices in the NAT traversal path may not support a NAT traversal mechanism that is being implemented to obtain an external address, for example. For instance, if a first node wishes to discover its external address, it sends a packet containing its private address through a particular NAT traversal path having one or more NAT devices. As the packet traverses through the path, the first NAT device in the path translates the private address into a translated address if the NAT device implements the currently used NAT traversal mechanism. The other NAT devices in the path also each translate the current address for the first node into another translated address for such first node if they support this NAT traversal mechanism.

If any of the NAT devices fail to support such NAT traversal mechanism, the first node's address will not be translated correctly as it travels down the NAT traversal path (i.e., one of the NAT devices will not translate the first node's address. Thus, the first node will fail to obtain it's correct external address. The first node will also fail to be notified of such failure and the first node will merely receive no response for it's "external address" query. The first node may continue to repeatedly query without realizing that a NAT traversal failure has occurred. As a result, this process may needlessly consume valuable processing resources.

In view of the above, there is a need for improved mechanisms for discovering whether any NAT devices fail to support such NAT traversal mechanism and preferably to recover from such failure.

SUMMARY OF THE INVENTION

Accordingly, the present invention provides methods and apparatus for facilitating translation of packet addresses (or ports) by one or more translation devices (e.g., NAT devices) using a specialized protocol to handle an address (or port) that is used to form part of a payload. In one implementation, this specialized protocol is referred to as Network Layer Signaling (NLS). As a packet traverses along a path containing one or more translation devices, each translation device is configured to translate an address (or port) of such packet's IP header if the packet is traversing between different domains (e.g., traversing between a private and public domain or between two different private domains). One or more of these translation devices may also be configured to implement the specialized protocol which includes translation device traversal mechanisms for detecting whether the traversal path contains a translation device that fails to implement such specialized protocol. When such a failure is detected, recovery mechanisms are also triggered.

In one embodiment, a method of facilitating translation of address or port information in a received packet is disclosed. The method includes (a) receiving a packet having one or more headers and a payload; (b) if the received packet indicates that it implements a translation device traversal protocol, determining whether the received packet has traversed a translation device that fails to implement the translation device traversal protocol based on one or more headers of the packet and not the payload; (c) if it is determined that the received packet has traversed a translation device that fails to implement the translation device traversal protocol, sending an error message back to an originator of the received packet indicating that a translation device in the received packet's path that fails to implement the translation device traversal protocol; and (d) if it is determined that the received packet has not traversed a translation device that fails to implement the translation device traversal protocol, processing the received packet.

In one aspect, the translation device traversal protocol is a Network Layer Signaling (NLS) Protocol. In another embodiment, determining whether the received packet has traversed a translation device that fails to implement the translation device traversal protocol comprising determining whether the IP address of the IP header that requires translation matches an address of a translation header of the received packet. In a further aspect, the IP address of the IP header that requires translation is matched to an address of the translation header that corresponds to an original IP source address of the originator of the received packet when a Mapped Address field of the translation header has been unchanged by any translation devices, and the IP address of the IP header that requires translation is matched to an address of the translation header corresponding to the Mapped Address field set equal to an address that has been inserted by a translation device and corresponds to a translation of the IP address when the Mapped Address field has been changed by a translation device.

In one embodiment, the address (or port) of the IP header and translation header require translation when the packet is being received from a first address (or port) domain and being sent to a different second address (or port) domain. In another embodiment, the received packet indicates that it implements a translation device traversal protocol by specifying a particular protocol type in one or more of the headers of the received packet. In a specific implementation, the received packet indicates that it implements a translation device traversal protocol by specifying a predefined User Datagram Protocol (UPD) port value.

In another implementation, processing the received packet includes (i) translating an address or port of an IP header of the received packet into a translated address or port; (ii) replacing an address or port of a translation header of the received packet with the translated address or port, wherein the address or port of the IP header equals the address or port of the translation header and is to be utilized by an application as part of the payload of the received packet if the received packet indicates replacement should occur; and (iii) forwarding the translated packet towards its destination if it is not already at an end node. In a further aspect, operations (b) through (d) as described above only when the received packet indicates that it is an NLS Message. When the received packet does not indicate that it is an NLS Message, the address (or port) of the IP header is merely translated and not the address (or port) of the translation header. The translated packet is then forwarded towards its destination. In another aspect, operations (b) through (d) only when the received packet is not an NLS TEARDOWN message indicating that mapping is to be dismantled. A mapping is removed for NLS TEARDOWN message and the packet is forwarded towards destination.

In another embodiment, the invention pertains to a computer system operable to facilitate translation of address or port information in a received packet. The computer system includes one or more processors and one or more memory. At least one of the memory and processors are adapted to provide at least some of the above described method operations. In yet a further embodiment, the invention pertains to a computer program product for facilitating translation of address or port information in a received packet. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
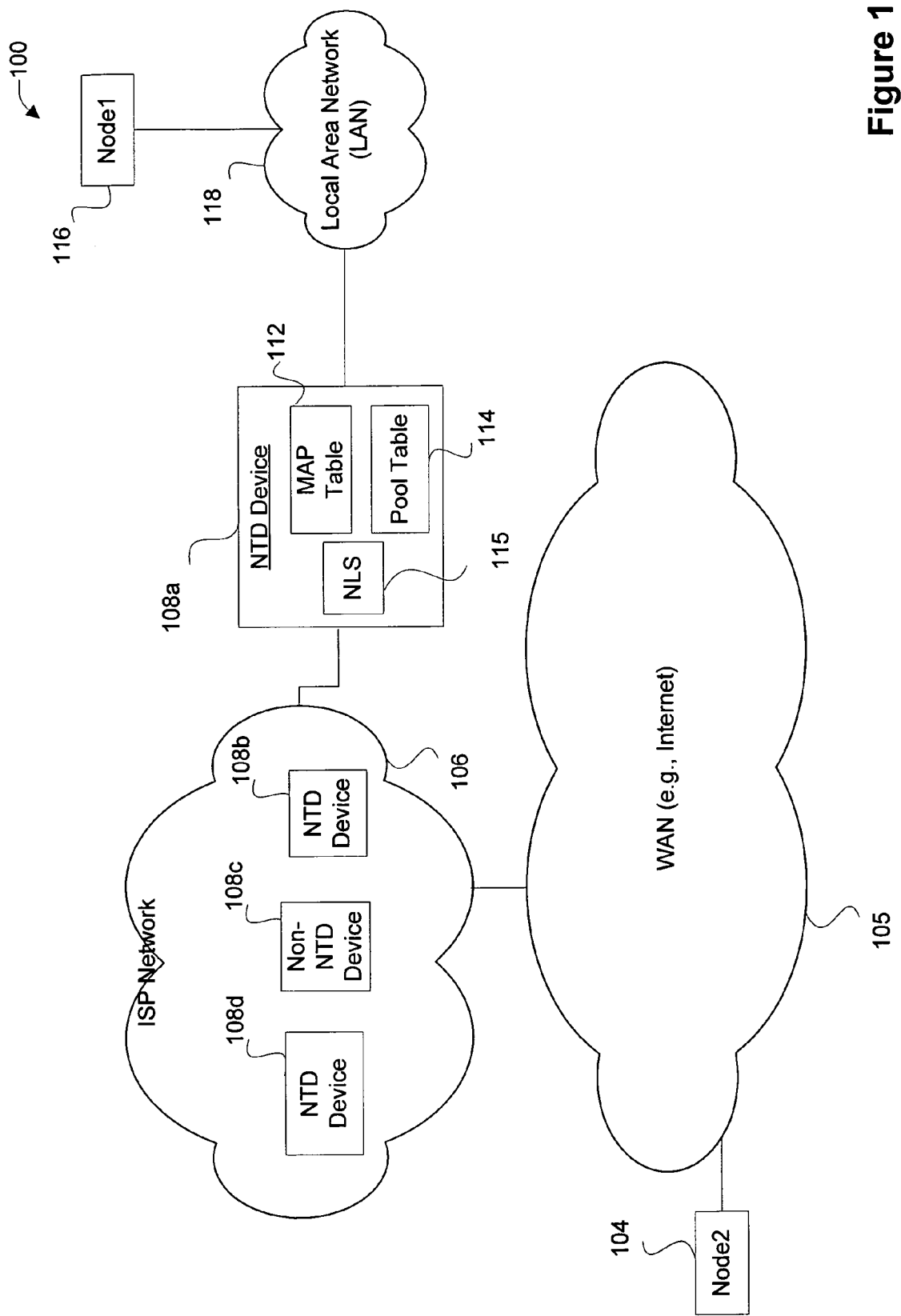
FIG. 1 is a diagrammatic representation of a network in which techniques of the present invention may be implemented in accordance with one embodiment of the present invention.

FIG. 1 is a diagrammatic representation of a network 100 in which techniques of the present invention may be implemented in accordance with one embodiment of the present invention. As shown, the network 100 includes a plurality of devices interconnected via a wide area network (WAN) 105, such as the Internet. Each device may also be coupled to the WAN 106 through a local area network (LAN) or one or more network devices. In the illustrated example, a first node device 116 (Node1) is coupled via LAN 118, network device 108a, and ISP (Internet Service Provider) network 106 to WAN 105. WAN 105 is also coupled with a second node (Node2) 104.

WAN 105, ISP Network 106, and/or LAN 118 may include any number and type of network elements, such as routers, NAT, PAT, or NAT-PT devices, nodes, clients, servers, and any suitable type of computer system. Each network device may include any suitable mechanisms for routing packets. For example, each network device 108a through 108c routes packets sent between Node1 116 and Node2 104.

In the illustrated embodiment, each network device may also be configured to implement a suitable translation process, such as NAT, PAT or NAT-PT, on packets routed between different address (or port) domains. In general, each network device 108 may use NAT to translate between an internal and external address, PAT to translate between an internal and external port, or NAT-PT to translate between different protocols, such as IPv4 and IPv6 protocols. Any combination of these translation protocols may be implemented by each network device 108. Although the term NAT device is used herein to describe the techniques of the present invention, it is recognized that these novel techniques may be practiced in the context of other types of translation devices, such as a PAT device or a NAT-PT device or any combination thereof.

Each network device 108 may utilize any suitable number and type of data structures for facilitating its operations as described herein. For example, the network device 108a is illustrated as utilizing an address pool table 114 having available translation addresses for the LAN 118 and a map table 112 for tracking bindings between private and public addresses (e.g., internal and external addresses or IPv4 and IPv6 addresses). Each of the other network devices 108b, 108c, and 108d may also utilize such data structures.

In the present invention, one or more of the network devices are configured to implement a specialized protocol which facilitates translation of addresses (or ports) that are used to form part of a packet payload by various applications. This specialized protocol generally facilitates NAT traversal. In the present implementation, this specialized protocol is a transport level protocol and is referred to herein as the "Network Layer Signaling" (NLS) Protocol. One or more end nodes may also be configured to implement this NAT traversal protocol. In FIG. 1, network devices 108a, 108b, and 108d are configured with NLS and are each referred to as a NTD (NAT traversal device), while network device 108c is not configured with NLS and is referred to as a Non-NTD (or non-NAT traversal device).

Although the present invention will now be described in relationship to this NLS Protocol, of course, any other suitable protocol for handling NAT traversal with respect to addresses (or ports) that are used to form part of a payload may be utilized for practicing the techniques of the present invention. Additionally, utilizing a translated address (or port) as part of a payload means that such translated address (or port) is processed with the payload by a suitable application and not that the translated address (or port) actually is embedded in such payload as further described below. For simplicity, the following description refers to translation of addresses although it is recognized that the present invention may also be practiced with respect to translation of ports.

In each NAT device, the NLS Protocol sits on top of the NAT function. In one implementation, the NLS protocol handles routing and NAT traversal for various communication applications. For instance, the NLS protocol works for different applications which utilize addresses that are conventionally embedded in the payload in various formats. In one aspect, NLS is a transport layer protocol that sits on top of one or more signaling applications which are in the application layer (e.g., of an end node). In general, techniques are described for implementing NLS in a NAT device or the like which will be used in place of various ALG's that are configured to handle differently formatted embedded addresses. Such NAT device will be configured with other ALG's in order to handle legacy applications that do not yet implement NLS (e.g., DNS and FTP).

In general, each NTD is configured with NLS to handle translation of packet addresses that are used to form part of the payload as well as part of the packet header(s). As a packet traverses along a path containing one or more translation devices, each translation device is configured to translate the address of such packet's IP header if the packet is traversing between different domains (e.g., traversing between a private and public domain or between two different private domains). This NLS Protocol also utilizes a specialized translation headers, such as an NLS header, which contains address that require translation, and each NTD is also configured to translate the NLS header address as well. Each NTD is also configured detect whether the NAT traversal path for each transmitted packet contains a Non-NTD that fails to implement NLS. When such a failure is detected, recovery mechanisms are also triggered.

Figure 2:
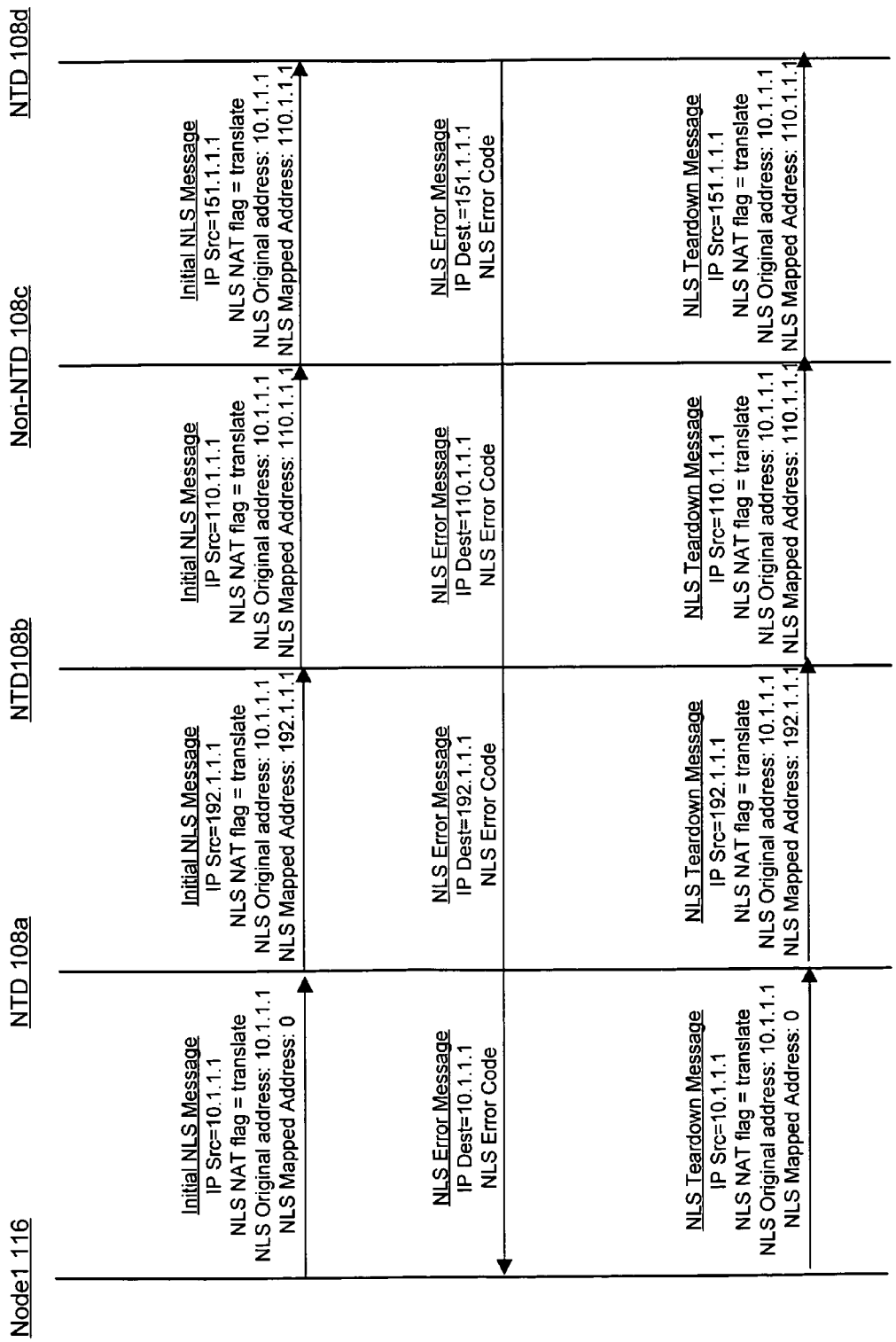
FIG. 2 is a communication diagram illustrating NAT traversal techniques in accordance with one embodiment of the present invention.
Figure 3:
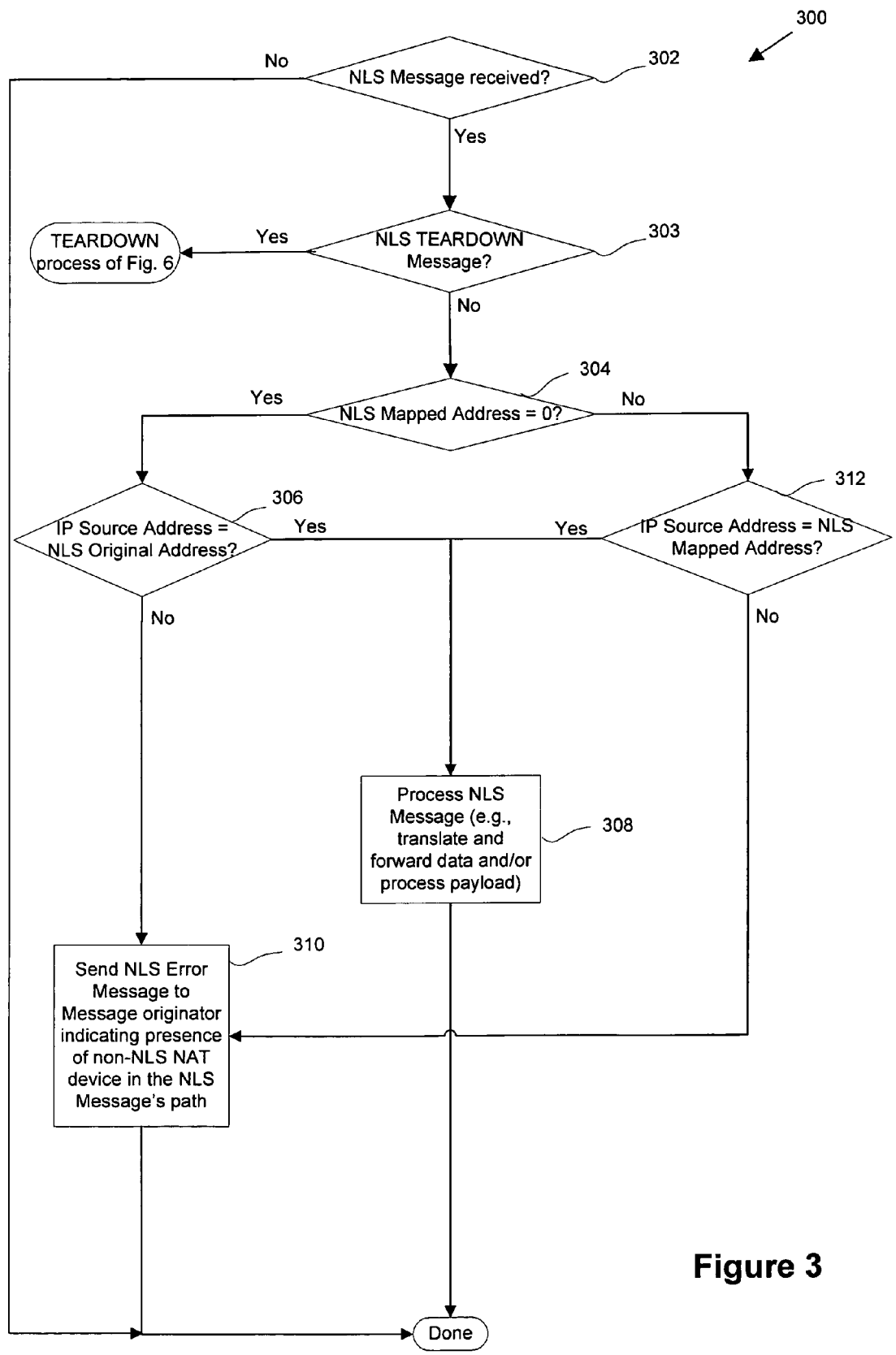
FIG. 3 is a flowchart illustrating a procedure for handling NLS Messages in accordance with one embodiment of the present invention.

FIG. 2 is a communication diagram illustrating NAT traversal techniques in accordance with one embodiment of the present invention. FIG. 3 is a flowchart illustrating a procedure 300 for handling NLS Messages in accordance with one embodiment of the present invention. This procedure 300 will be described in conjunction with the communication diagram of FIG. 2. This procedure 300 for handling NLS message may be configured in an NTD, such as each of the NTD's 108a, 108b, and 108d of FIG. 1. In contrast, a Non-NTD (e.g., 108c of FIG. 1) may be configured to translate an address in the received packet using a conventional technique, such as merely translating the IP header address and attempting to translate an embedded address using an appropriate ALG.

Initially as illustrated in FIG. 3, the NTD is configured to determine whether an NLS message has been received in operation 302. The received packet may be examined to determine whether it has a field that identifies it as an NLS Message. In one implementation, a port in the UDP header is set to a port value that corresponds to NLS. In other embodiments, a TCP or IP field may be used to identify an NLS message. If the received message is not an NLS message, this procedure 300 for handling NLS messages is skipped.

In the example of FIG. 2, Node1 116 initially sends an NLS message towards another node (e.g., such as Node2 104 of FIG. 1). In the present example, the sending node (Node1) is configured with NLS and is part of a private domain. As shown in FIG. 2, this message includes a private IP source address equal to 10.1.1.1 along with an NLS header. The NLS header includes information that may be utilized by NTD's to perform the NAT traversal techniques of the present invention. In one implementation, the NLS header includes an NLS NAT Flag set to a "translate" option, an NLS Original Address field set equal to the IP source address 10.1.1.1, and an NLS Mapped Address field that is initially set equal to zero. This NLS message is initially received by NTD 108a.

If an NLS message has been received (e.g., by NTD 108a), it is then determined whether the received NLS message is an NLS TEARDOWN Message in operation 303. If an NLS TEARDOWN Message has been received, then a process for handling TEARDOWN Message is implemented and the procedure 300 ends. A TEARDOWN Message handling procedure is further described below.

If a TEARDOWN Message has not been received, it is then determined whether the NLS Mapped Address field is equal to zero in operation 304. Of course, the NLS Mapped Address may be set to any suitable predefined value by the originating node so that NTD's can then determine whether this value has changed. The NLS Mapped Address may be set to zero when the NLS message is being received at a first NTD and no other NTD's have touched this field. If the NLS Mapped Address equals zero, it is then determined whether the IP source address equals the NLS Original Address in operation 306. If this determination is true, the NLS message is then processed in operation 308 and the procedure then ends. For example, the packet is translated and forwarded to its destination.

The IP source address equals the NLS Original Address when there have been no intervening Non-NTD between the sending node and the receiving NTD. An intervening Non-NTD would have translated the IP source address without touching the NLS header's NLS Original Address and Mapped Address fields since the Non-NTD is not configured to handle NLS headers. Thus, the Mapped Address would still equal zero, while the NLS Original Address would differ from the translated IP Source Address. If the IP source address does not equal the NLS original address, an NLS error message may then be sent back to the originator of the NLS Message indicating that a Non-NTD is present in the NLS message's path in operation 310. The procedure then ends.

If the NLS NAT address does not equal zero, it is then determined whether the IP source address equals the NLS Mapped Address in operation 312. If these two addresses are equal, the NLS message is then processed in operation 308. If these addresses are not equal, an NLS Error Message is then sent in operation 310 indicating that a Non-NTD is present in the NLS message's path in operation 310. The procedure then ends.

In the example of FIG. 2, when the NLS Message is received at NTD 108a, the IP Source address 10.1.1.1 still equals the NLS Original Address since there are no other intervening NAT devices. Thus, it is determined that there are no Non_NTD's present within the traversal path and the received NLS message is translated and forwards towards its destination as described further below.

Figure 4:
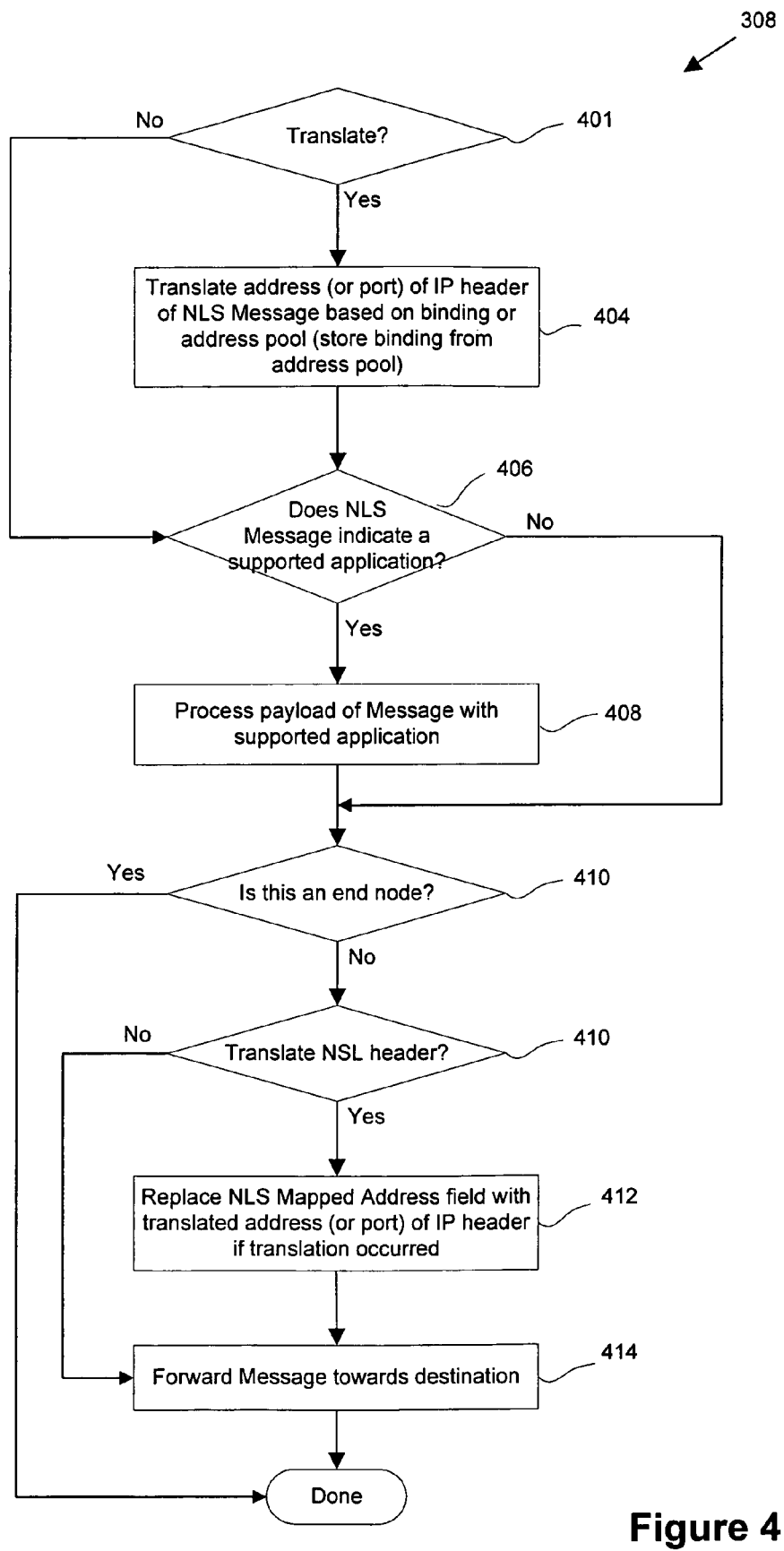
FIG. 4 is a flowchart illustrating the operation of FIG. 3 for processing a received NLS message in accordance with one implementation of the present invention.

FIG. 4 is a flowchart illustrating the operation 308 of FIG. 3 for processing a received NLS message in accordance with one implementation of the present invention. Initially, the receiving NTD determines whether an address translation is to be performed on the currently received packet in operation 401. For instance, the NTD determines whether the packet is being received on an interface that has a different domain then the outgoing interface. For the packet received at NTD 108a of FIG. 2, the NTD is configured to translate addresses from domain 10.1/16 into addresses in domain 192.1/16. Thus, the IP Source address 10.1.1.1 requires translation. If translation is required, the IP address of the IP header that requires translation is translated based on a previously stored binding or based on an address obtained from the address pool in operation 404. When an address is first translated, an unused address is obtained from the NTD's address pool to use for the translation. In the example of FIG. 2, the pool address 192.1.1.1 is substituted for the IP source address 10.1.1.1. The binding between 10.1.1.1 and 192.1.1.1 is stored (e.g., within a MAP table). For subsequent translations of this same address, the stored binding may be utilized.

After the IP header is translated, 402. it is then determined whether the NLS message indicates a supported application in operation 406. Some NTD's may be configured with applications that process the payload of the received NLS message and any address that are used to form part of the payload. In one implementation, the NLS header may also contain an application identifier (not shown) that specifies an application that will process the payload and corresponding payload address. If there is a supported application in the receiving NLS device, the payload is then processed with the supported application in operation 408. If there is no supported application, operation 408 is skipped.

Typically, the payload would not be processed by an application until it reaches an endnode (e.g., Node2 104). However, there are a number of situations where the packet may be processed by an intermediary network device or NTD that is between two endnodes. For example, a firewall pinhole application may be implemented on the payload and its corresponding payload address.

In one implementation, the NLS header will also contain an offset or tag that corresponds to the NLS Mapped Address field. This offset or tag corresponds to a position in the payload in which the Mapped Address should be inserted by the processing application. Several embodiments for utilizing tags or offsets in the payload to facilitate payload address processing are further described in co-pending U.S. patent application Ser. No. 10/985,563 entitled "Address Tagging for Network Address Translation (NAT) Traversal", filed 9 Nov. 2004 by Melinda L. Shore, which application is incorporated herein by reference in its entirety for all purposes.

It is then determined whether this is an end node in operation 410. If this is an end node, this operation 408 for processing the NLS message ends. If this is not an end node, it is then determined whether the NLS header should be translated in operation 410. In a specific implementation, if the NLS NAT bit is set to a value corresponding to "translate", it is then determined that the NLS header is to be translated. The NLS Mapped Address field is then replaced with the new translated IP header address (e.g., from operation 404) in operation 412. Otherwise, if the NLS NAT bit is set to a value corresponding to "No_Rewrite", it is determined that the NLS header should not be translated and operation 412 is skipped. The packet is then forwarded towards its destination in operation 414.

In the example of FIG. 2, NTD 108a translates the IP source address to a new pool address 192.1.1.1 and also substitutes this new translated address into the NLS Mapped Address field. The NTD 108a then forwards this translated packet having IP source address 192.1.1.1, NLS NAT flag equal to "translate" value (unchanged), NLS Original Address equal to 10.1.1.1 (unchanged), and NLS Mapped Address equal to 192.1.1.1 towards its destination. NTD 108b receives this translated NLS Message and similarly processes it. NTD 108b is configured to translate from address domain 192.1/16 to domain 110.1/16. Thus, the received NLS Message's IP Source Address 192.1.1.1 is translated to pool address 110.1.1.1, for example. Likewise, since the NLS NAT flag remains set to "translate", this new IP Source address is also written over the NLS Mapped Address 192.1.1.1. NTD 108b then forwards this translated NLS Message having IP source address 110.1.1.1, NLS NAT flag equal to "translate" value (unchanged), NLS Original Address equal to 10.1.1.1 (unchanged), and NLS Mapped Address equal to 110.1.1.1 towards its destination. In the NTD 108b, it is determined that there are no Non-NTD's present within the received NLS Message's traversal path since the IP source address 192.1.1.1 equals the NLS Mapped Address 192.1.1.1.

Non-NTD 108c receives the translated NLS Message from NTD 108d. In this example, Non-NTD 108c is merely configured with conventional NAT functions and not configured to implement a NAT traversal capability, such as NLS. Thus, the IP Source address of the received NLS Message is merely translated to a new pool address 151.1.1.1. However, the NLS header remains untouched by the Non-NTD. Accordingly, Non-NTD 108c forwards a translated NLS Message having IP source address 151.1.1.1, NLS NAT flag equal to "translate" value (unchanged), NLS Original Address equal to 10.1.1.1 (unchanged), and NLS Mapped Address equal to 192.1.1.1 (unchanged) towards its destination. It should be noted that Non-NTD 108c does not replace the NLS Mapped Address with the new translated IP source address 151.1.1.1.

When NTD 108d receives the NLS Message from Non-NTD 108c, it determines that the IP Source address 151.1.1.1 does not equal the NLS Mapped Address 110.1.1.1. Thus, referring to the NLS Message handling procedure 300 of FIG. 3, an NLS Error Message indicating the presence of a Non-NTD within the NLS Message path is sent back to the Message originator (e.g., Node1 116). Any suitable mechanism may be used to convey this error message. In the example of FIG. 2, the return NLS Message contains an IP Source Address equal to 151.1.1.1 and an NLS Error Code that indicates the Non-NTD presence. As this NLS Error Message traverses through the network devices, the IP destination is translated from 151.1.1.1 to 110.1.1.1 to 192.1.1.1 and finally to 10.1.1.1, which is the private address of Node1 116. The end node Node1 116 may then process the error, e.g., halt communication with an end node using NLS. An alternative communication technique may then be utilized, such as a conventional technique for embedding addresses in the payload.

Figure 5:
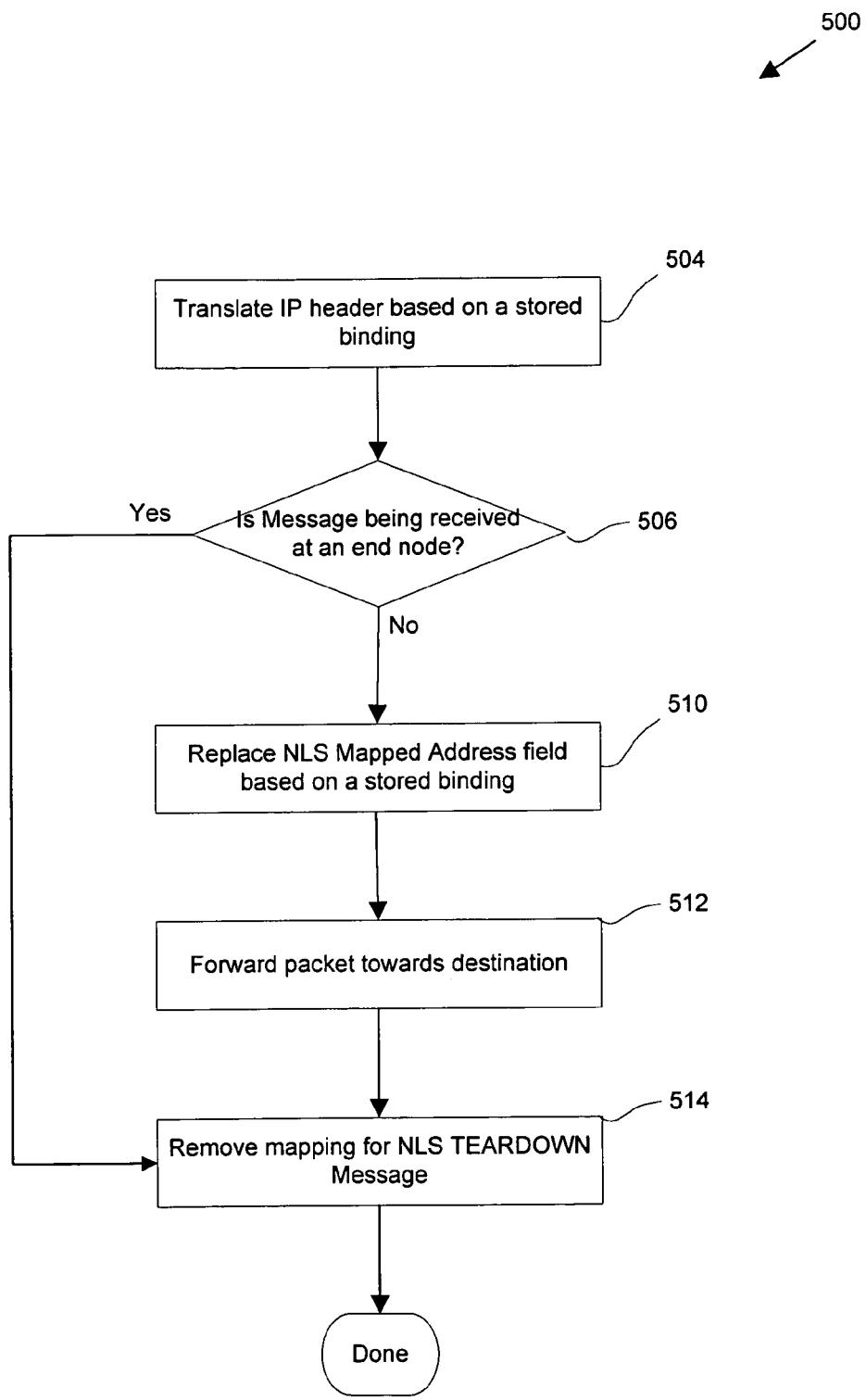
FIG. 5 is a flowchart illustrating a procedure for handling an NLS tear down message in accordance with one embodiment of the present invention.

In one implementation, when an end node receives an NLS Error Message indicating that its last sent NLS Message traversed a Non-NTD, the end node sends an NLS TEARDOWN Message towards the same destination as the previously sent NLS Message. FIG. 5 is a flowchart illustrating a procedure 500 for handling an NLS TEARDOWN message in accordance with one embodiment of the present invention. As shown in FIG. 2, end node 116 sends an NLS TEARDOWN Message that is received at NTD 108a.

The NLS TEARDOWN Message handling procedure of FIG. 5 may be implemented in each NTD that receives such TEARDOWN Message. For instance, it may have been determined in the procedure for handling an NLS Message of FIG. 3 that a particular received NLS Message is an NLS TEARDOWN Message in operation 303. For example, it may be determined that a TEARDOWN bit in the NLS header is set to one. The procedure 300 for handling an NLS Message then jumps to the procedure 500 of FIG. 5.

Referring to FIG. 5, the IP header is translated based on a previously stored binding in operation 504. It is then determined whether the message is being received at an end node in operation 506. If this is an end node, the mapping for the NLS TEARDOWN message is merely removed (if appropriate) in operation 514. If this is an end node that does not perform a NAT function, of course, this operation 514 is skipped and the TEARDOWN procedure ends. If this is not an end node, the NLS Mapped Address field is replaced based on the previously stored binding (or the new translated IP header address) in operation 510. The packet is then forwarded towards its destination in operation 512. The mapping is also removed for the NLS TEARDOWN message in operation 514. For instance, the binding stored for the translated IP header address is removed from the MAP table of the receiving NTD. The procedure 500 then ends.

Referring to FIG. 2, node1 116 sends NLS TEARDOWN Message having IP Source Address 10.1.1.1, NLS NAT flag equal to a "translate" value, NLS Original Address (though not required) equal to 10.1.1.1, and NLS Mapped Address equal to zero. As the NLS Message passes through each NTD, both the IP Source Address and NLS Mapped Address are replaced with new translated addresses. When the NLS TEARDOWN Message reaches the last NTD 108d, the NLS Mapped address is no longer correct since the Non-NTD 108c failed to translate it. However, the NTD 108d may be configured to not create a binding at all when a NAT traversal problem occurs with the original NLS Message or may remove its binding/mapping based on the IP Source address. The NLS Mapped Address field is optional and the TEARDOWN procedure may merely be implemented based on the IP address and whether or not the NLS TEARDOWN bit is set.

Figure 6:
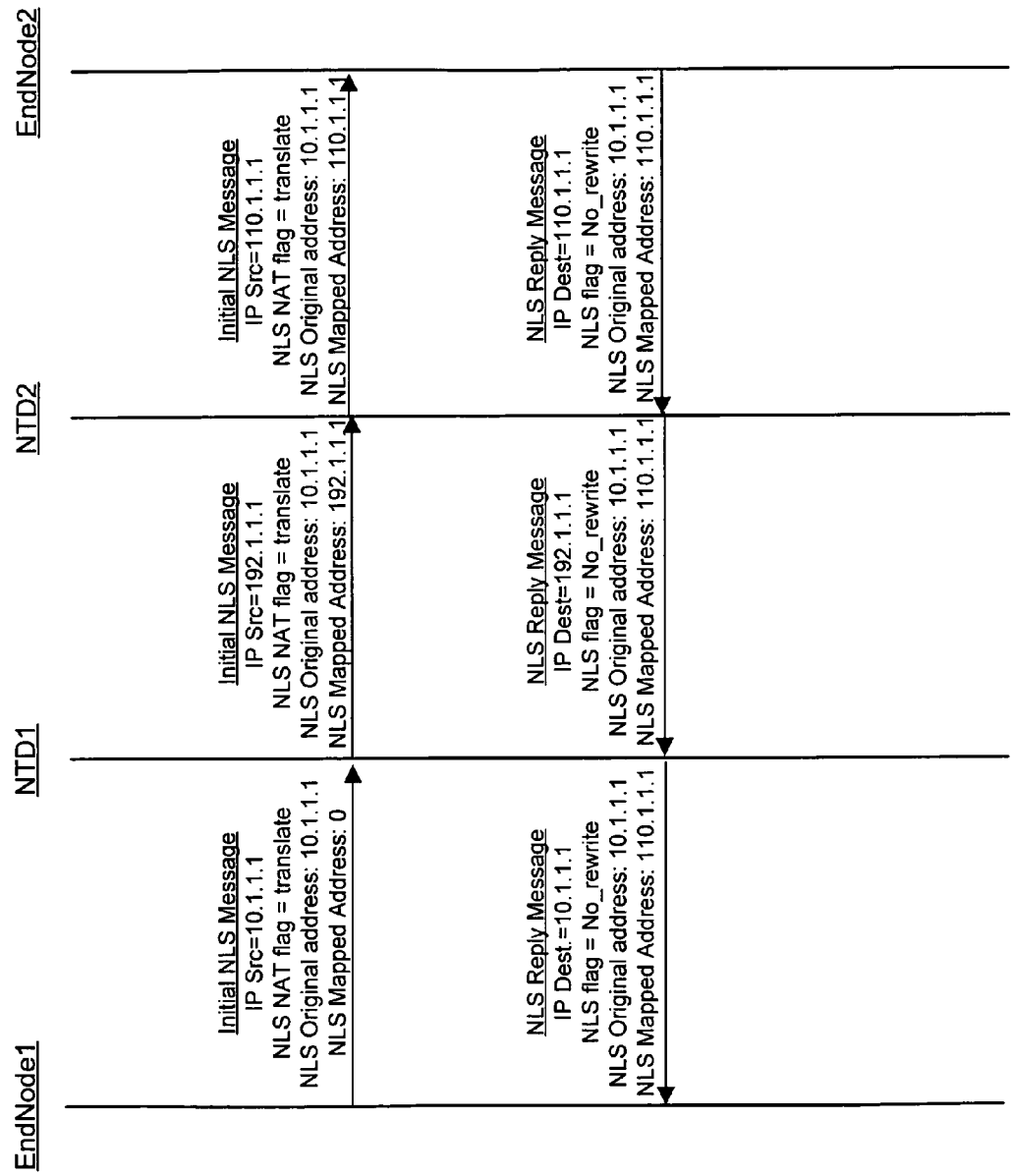
FIG. 6 is an example communication diagram illustrating NAT traversal when all of the NAT devices are configured with NLS in accordance with one implementation of the present invention.

FIG. 6 is an example communication diagram illustrating NAT traversal when all of the NAT devices are configured with NLS in accordance with one implementation of the present invention. In this example, a first end node (endnode1) is attempting to obtain a global address for its private address by sending an NLS Message. This NLS message has an IP source address equal to 10.1.1.1, an NLS NAT flagged equal to translate, an NLS original address equal to 10.1.1.1, and an NLS mapped address equal to zero. A first NAT Traversal Device (NTD1) first receives this Message and translates the IP source address into a mapped address 192.1.1.1. This new mapped address also replaces the NLS mapped address in the NLS header. The NTD1 then forwards the translated NLS message toward a second NAT Traversal Device (NTD2). This NTD2 translates the IP source address into 110.1.1.1 and also replaces the NLS mapped address with this translated address. An end node (endnode2) then receives the translated NLS message.

Endnode2 then returns some form of this NLS message as an NLS reply message so as to communicate the original sender node's global address. However, the NLS flag is now set to No_Rewrite. This flag indicates that the NLS mapped address should not be translated by intervening NTD's. This way, endnode1 receives a global address 110.1.1.1 (in the NLS Mapped Address) for its initial private address 10.1.1.1. Each NAT device (or NTD) in the path of the NLS reply message does not translate the NLS mapped address since the NLS flag is set to No_rewrite although the IP headers continue to be translated.

The endnode1 can then use its global address within its payload so that problems with NAT traversal are avoided. Alternatively, an end node may simply use tags or offsets (as described in the above referenced U.S. patent application by Melinda L, Shore) to match translated addresses in the header to positions in the payload. Hence, a receiving application can easily process the payload and its corresponding translated addresses.

Thus, embodiments of the present invention provide a mechanism for detecting NAT devices which are not configured yet with a NAT traversal mechanism such as NLS. When all the NAT devices in a particular path support the NAT traversal mechanism, an end node can then confidently setup communication between the other end node of such path using a NAT traversal technique for facilitating translation of addresses (or ports) that are used as part of the payload by various applications. Embodiments of the present invention also provide recovery from the presence of a device that does not implement NAT traversal by tearing down previously stored bindings for such path. Thus, unused pool addresses are not unnecessarily locked and can be efficiently reused by another device.

The above described example is applied to a source address of the sending node as it is translated across a NAT traversal path. Of course, these techniques may also be applied to a destination address. That is, the IP Source and NLS Mapped Address of the NLS Message may correspond to the destination address, rather than the source address. Additionally, more than one address may be translated or utilized in the NLS header or multiple NLS headers. These multiple tags addresses may correspond to different or the same application types.

Embodiments of the present invention provide several advantages. For example, the need for a stateful inspection of the payload at the NAT device is avoided. Accordingly, a broad range of protocols may be supported by each NAT device since each NAT device does not have to be configured for each new protocol since it only needs to translate the header and not inspect the payload for differently formatted embedded addresses. Additionally, encrypted protocol streams with addresses may be easily used since the traversed NAT devices do not have to examine the payload content. Integrity-protected protocol streams with address data may also be used while correctly traversing cooperating NAT devices.

Generally, the techniques for sending or handling data having address data (as well as for translating addresses and protocols) of the present invention may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, one or more techniques of the present invention may be implemented on a general-purpose network host machine such as a personal computer or workstation. Further, the invention may be at least partially implemented on a card (e.g., an interface card) for a network device or a general-purpose computing device.

Figure 7:
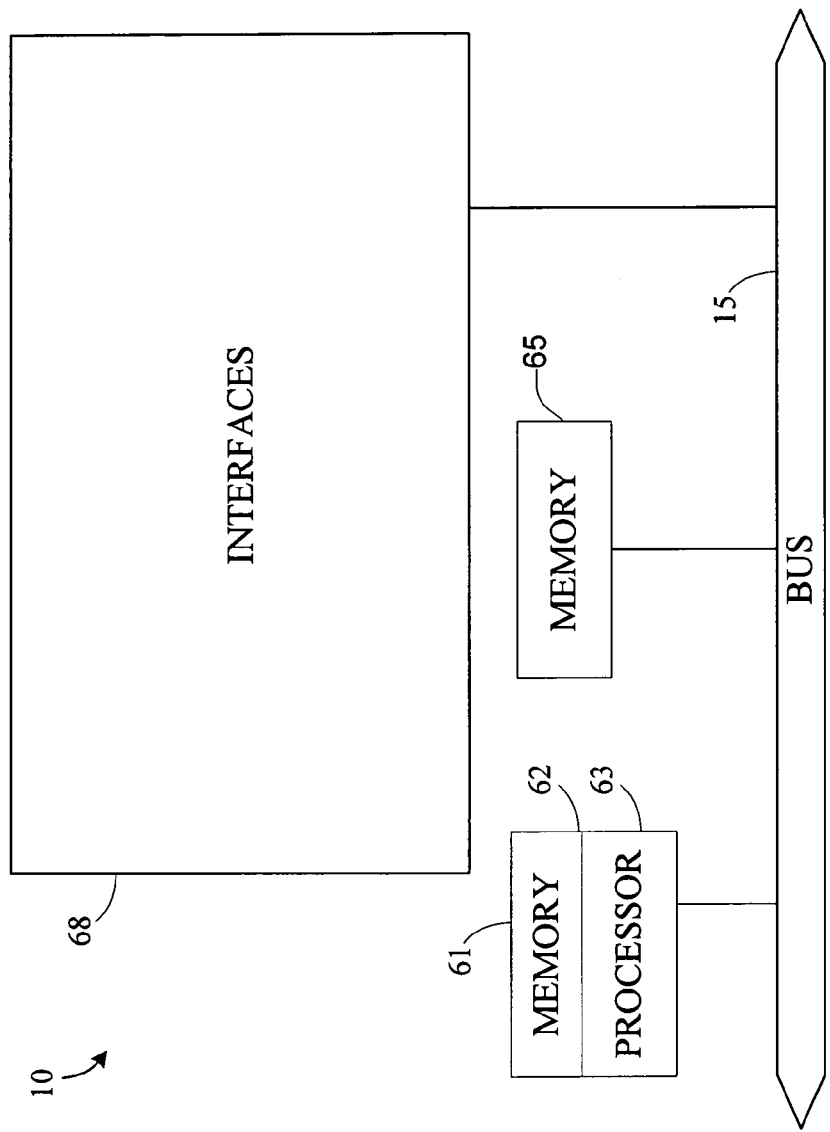
FIG. 7 is a diagrammatic representation of a router suitable for implementing portions of the present invention in accordance with one embodiment of the present invention.

Referring now to FIG. 7, a router 10 suitable for implementing portions of the present invention (such as the translation and/or NAT traversal techniques) includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for performing any combination of the above described techniques of the present invention. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 7 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, a MAP table, a pool table, connection tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of facilitating translation of address or port information in a received packet, comprising:

(a) receiving a packet having one or more headers and a payload;

(b) if the received packet indicates that it implements a translation device traversal protocol, determining whether the received packet has traversed a translation device that implements translation of the IP (internet protocol) header but fails to implement the translation device traversal protocol by failing to translate an address of a translation header, wherein the translation header differs from the IP header: based on one or more headers of the packet and not the payload;

(c) if it is determined that the received packet has traversed a translation device that fails to implement the translation device traversal protocol, sending an error message back to an originator of the received packet indicating that a translation device in the received packet's path fails to implement the translation device traversal protocol; and (d) if it is determined that the received packet has not traversed a translation device that fails to implement the translation device traversal protocol, processing the received packet.

2. The method of claim 1, wherein the translation device traversal protocol is a Network Layer Signaling (NLS) Protocol.

3. The method of claim 1, wherein determining whether the received packet has traversed a translation device that fails to implement the translation device traversal protocol comprises determining whether an IP address of the IP header of the received packet matches an address of the translation header of the received packet.

4. The method of claim 3, wherein it is determined that an IP address of the IP header that requires matches an address of the translation header when the translation header includes an original IP source address of the originator of the received packet and a Mapped Address field of the translation header indicates that no translation devices have translated an address of the translation header, and it is determined that an IP address of the IP header matches an address of the translation when the address of the Mapped Address field matches an IP address of the IP header, and it is determined that an IP address of the IP header does not match an address of the translation header when the address of the Mapped Address field does not match an IP address of the IP header and does not indicate that no translation devices have translated an address of the translation header.

5. The method of claim 1, wherein the address (or port) of the IP header and translation header require translation when the packet is being received from a first address (or port) domain and being sent to a different second address (or port) domain.

6. The method of claim 1, wherein the received packet indicates that it implements a translation device traversal protocol by specifying a particular protocol type in one or more of the headers of the received packet.

7. The method of claim 1, wherein the received packet indicates that it implements a translation device traversal protocol by specifying a predefined User Datagram Protocol (UDP) port value.

8. The method of claim 1, wherein processing the received packet comprises:

translating an address or port of the IP header of the received packet into a translated address or port;

translating an address or port of a the translation header of the received packet by replacing the address of such translation header with the translated address or port, wherein the address or port of the IP header equals the address or port of the translation header and is to be utilized by an application as part of the payload of the received packet if the received packet indicates replacement should occur; and forwarding the translated packet towards its destination if the received packet it is not already at an end node.

9. The method of claim 8, performing operations (b) through (d) only when the received packet indicates that it is an NLS Message that requires translation of an address of the translation header, the method further comprising:

when the received packet does not indicate that it is an NLS Message that requires translation of an address of the translation header, merely translating the address (or port) of the IP header and not the address (or port) of the translation header and then forwarding the translated packet towards its destination.

10. The method of claim 9, performing operations (b) through (d) only when the received packet is not an NLS TEARDOWN message indicating that mapping is to be dismantled, the method further comprising:

removing a mapping for NLS TEARDOWN message and forward packet towards destination.

11. A computer system operable to facilitate translation of address or port information in a received packet, the computer system comprising:
one or more processors;
one or more memory, wherein at least one of the processors and memory are configured to perform the following operations:
(a) receiving a packet having one or more headers and a payload;
(b) if the received packet indicates that it implements a translation device traversal protocol, determining whether the received packet has traversed a translation device that implements translation of the IP (internet protocol) header but fails to implement the translation device traversal protocol by failing to translate an address of a translation header, wherein the translation header differs from the IP header;
(c) if it is determined that the received packet has traversed a translation device that fails to implement the translation device traversal protocol, sending an error message back to an originator of the received packet indicating that a translation device in the received packet's path fails to implement the translation device traversal protocol; and
(d) if it is determined that the received packet has not traversed a translation device that fails to implement the translation device traversal protocol, processing the received packet.

12. The computer system of claim 11, wherein the translation device traversal protocol is a Network Layer Signaling (NLS) Protocol.

13. The computer system of claim 11, wherein determining whether the received packet has traversed a translation device that fails to implement the translation device traversal protocol comprises determining whether an IP address of the IP header of the received packet matches an address of the translation header of the received packet.

14. The computer system of claim 13, wherein
it is determined that an IP address of the IP header that requires matches an address of the translation header when the translation header includes an original IP source address of the originator of the received packet and a Mapped Address field of the translation header indicates that no translation devices have translated an address of the translation header, and
it is determined that an IP address of the IP header matches an address of the translation when the address of the Mapped Address field matches an IP address of the IP header, and
it is determined that an IP address of the IP header does not match an address of the translation header when the address of the Mapped Address field does not match an IP address of the IP header and does not indicate that no translation devices have translated an address of the translation header.

15. The computer system of claim 11, wherein the address (or port) of the IP header and translation header require translation when the packet is being received from a first address (or port) domain and being sent to a different second address (or port) domain.

16. The computer system of claim 11, wherein the received packet indicates that it implements a translation device traversal protocol by specifying a particular protocol type in one or more of the headers of the received packet.

17. The computer system of claim 11, wherein the received packet indicates that it implements a translation device traversal protocol by specifying a predefined User Datagram Protocol (UDP) port value.

18. The computer system of claim 11, wherein processing the received packet comprises:
translating an address or port of the IP header of the received packet into a translated address or port;
translating an address or port of the translation header of the received packet by replacing the address of such translation header with the translated address or port, wherein the address or port of the IP header equals the address or port of the translation header and is to be utilized by an application as part of the payload of the received packet if the received packet indicates replacement should occur; and
forwarding the translated packet towards its destination if the received packet not already at an end node.

19. The computer system of claim 18, performing operations (b) through (d) only when the received packet indicates that it is an NLS Message that requires translation of an address of the translation header, wherein the at least one of the processors and memory are further configured to perform the following operations:
when the received packet does not indicate that it is an NLS Message that requires translation of an address of the translation header, merely translating the address (or port) of the IP header and not the address (or port) of the translation header and then forwarding the translated packet towards its destination.

20. The computer system of claim 19, performing operations (b) through (d) only when the received packet is not an NLS TEARDOWN message indicating that mapping is to be dismantled, wherein the at least one of the processors and memory are further configured to perform the following operations:
removing a mapping for NLS TEARDOWN message and forward packet towards destination.

21. A computer-readable medium encoded with computer-executable instructions that are configured for:
(a) receiving a packet having one or more headers and a payload;
(b) if the received packet indicates that it implements a translation device traversal protocol, determining whether the received packet has traversed a translation device that implements translation of the IP (internet protocol) header but fails to implement the translation device traversal protocol by failing to translate an address of a translation header, wherein the translation header differs from the IP header: based on one or more headers of the packet and not the payload;
(c) if it is determined that the received packet has traversed a translation device that fails to implement the translation device traversal protocol, sending an error message back to an originator of the received packet indicating that a translation device in the received packet's path fails to implement the translation device traversal protocol; and (d) if it is determined that the received packet has not traversed a translation device that fails to implement the translation device traversal protocol, processing the received packet.

22. The computer-readable medium of claim 21, wherein the translation device traversal protocol is a Network Layer Signaling (NLS) Protocol.

23. The computer-readable medium of claim 21, wherein determining whether the received packet has traversed a translation device that fails to implement the translation device traversal protocol comprises determining whether an IP address of the IP header of the received packet matches an address of the translation header of the received packet.

24. The computer-readable medium of claim 23, wherein
it is determined that an IP address of the IP header that requires matches an address of the translation header when the translation header includes an original IP source address of the originator of the received packet and a Mapped Address field of the translation header indicates that no translation devices have translated an address of the translation header, and
it is determined that an IP address of the IP header matches an address of the translation when the address of the Mapped Address field matches an IP address of the IP header, and
it is determined that an IP address of the IP header does not match an address of the translation header when the address of the Mapped Address field does not match an IP address of the IP header and does not indicate that no translation devices have translated an address of the translation header.

25. The computer-readable medium of claim 21, wherein the address (or port) of the IP header and translation header require translation when the packet is being received from a first address (or port) domain and being sent to a different second address (or port) domain.

26. The computer-readable medium of claim 21, wherein the received packet indicates that it implements a translation device traversal protocol by specifying a particular protocol type in one or more of the headers of the received packet.

27. The computer-readable medium of claim 21, wherein the received packet indicates that it implements a translation device traversal protocol by specifying a predefined User Datagram Protocol (UDP) port value.

28. The computer-readable medium of claim 21, wherein processing the received packet comprises:
translating an address or port of the IP header of the received packet into a translated address or port;
translating an address or port of a the translation header of the received packet by replacing the address of such translation header with the translated address or port, wherein the address or port of the IP header equals the address or port of the translation header and is to be utilized by an application as part of the payload of the received packet if the received packet indicates replacement should occur; and
forwarding the translated packet towards its destination if the received packet is not already at an end node.

29. The computer-readable medium of claim 28, wherein performing operations (b) through (d) are only performed when the received packet indicates that it is an NLS Message that requires translation of an address of the translation header, the computer-executable being further configured for:
when the received packet does not indicate that it is an NLS Message that requires translation of an address of the translation header, merely translating the address (or port) of the IP header and not the address (or port) of the translation header and then forwarding the translated packet towards its destination.

30. The computer-readable medium of claim 29, wherein performing operations (b) through (d) are only performed when the received packet is not an NLS TEARDOWN message indicating that mapping is to be dismantled, the computer-executable program instructions being further configured for:
removing a mapping for NLS TEARDOWN message and forward packet towards destination.

31. An apparatus for facilitating translation of address or port information in a received packet, comprising:
means for (a) receiving a packet having one or more headers and a payload;
means for (b) if the received packet indicates that it implements a translation device traversal protocol, determining whether the received packet has traversed a translation device that implements translation of the IP (internet protocol) header but fails to implement the translation device traversal protocol by failing to translate an address of a translation header, wherein the translation header differs from the IP header;
means for (c) if it is determined that the received packet has traversed a translation device that fails to implement the translation device traversal protocol, sending an error message back to an originator of the received packet indicating that a translation device in the received packet's path fails to implement the translation device traversal protocol; and
means for (d) if it is determined that the received packet has not traversed a translation device that fails to implement the translation device traversal protocol, processing the received packet.

* * * * *